Aug. 23, 1960
R. LANCON
2,949,818
SPECTACLES WITH REMOVABLE LENSES
Filed June 12, 1958
Fig. 2
Fig. 1
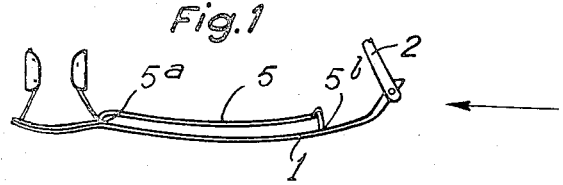
Fig. 3
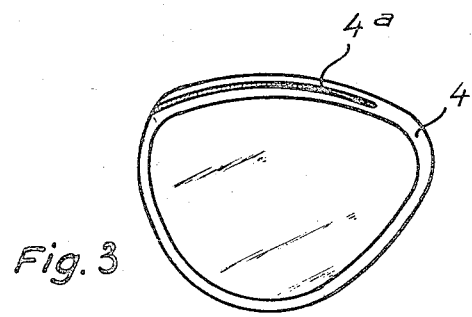
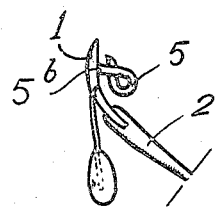
Fig. 4

United States Patent Office 2,949,818
Patented Aug. 23, 1960

2,949,818
SPECTACLES WITH REMOVABLE LENSES

Roger Lancon, 26 Rue Victor-Hugo, Morez, France

Filed June 12, 1958, Ser. No. 741,525

Claims priority, application France June 12, 1957

1 Claim. (Cl. 88—47)

This invention relates to spectacles, and its object is to provide improved spectacles wherein the lenses will be readily removable from and insertable into the frame without having to dismantle the frame nor use special tooling; and wherein this highly desirable feature will not detract from the appearance of the spectacles, or complicate their manufacture.

This invention, accordingly, provides spectacles having a frame and lenses, and means on said frame adapted for cooperation with portions of the lenses to retain the lenses in predetermined positions in the frame, said lenses being manually insertable into and removable out of cooperating relationship with said means. The said means preferably comprise wire-like elements having their ends secured, e.g. soldered, to the frame on the rear side of the frame, so as to extend generally parallel to the frame and define therewith a pair of elongated slots into which peripheral portions of the lenses, or of the rims thereof, are adapted to be resiliently inserted so as to be firmly yet removably retained thereby in position. Preferably, shallow grooves are formed in the portions of the lenses, or lens rims, cooperating with said slots and said elements are adapted to snap into said grooves to be resiliently retained thereby.

An exemplary embodiment of the invention will now be described for purposes of illustration but not of limitation with reference to the accompanying drawings, wherein:

Fig. 1 is an overhead view of the left side of a spectacles mounting according to an embodiment of the invention;

Fig. 2 is an overhead view of a corresponding rimmed lens or glass;

Fig. 3 is a view of the rear side of the right-hand rimmed lens or glass for the spectacles of Fig. 1; and Fig. 4 is a fragmentary side view of the improved spectacle frame as seen on the arrow in Fig. 1.

Referring to the drawings, Fig. 1 partially illustrates a frame 1 for spectacles according to the invention, having a conventional side branch 2 pivoted to an end of it, the left hand end as shown. A wire-like element 5 which may be made of metal, suitable plastic, or the like, has its ends soldered to the rear side of the frame 1 at 5a and 5b, respectively near the nose bridge and towards the side pivot. It will be understood that a similar element 5 is provided on the right side of the frame, not shown. Each element 5 is bent so as to have a main or intermediate portion which extends generally parallel to the adjacent frame element 1 and defines an elongated gap or slot therewith.

As shown in Figs. 2 and 3, each of the lenses has a groove 4a formed in the upper part of the rim 4 of the lens, which groove corresponds in shape to the main portion of the corresponding element 5. Moreover, the dimensioning is such that the lens rim can be inserted into the slot defined by the related element 5 by exerting slight pressure, whereupon the element 5 will snap into the groove 4a owing to the resiliency of the material from which the elements 5 are made. As shown in Fig. 4, each element 5 may be so shaped that the main or intermediate portion of the element connects with one or each of the upstanding end portions of the element which are soldered to the frame, by way of an arcuate loop which increases the resiliency of the element and facilitates insertion of the lens.

The groove such as 4a may be formed either in the glass material of the lens, or in a metallic or plastic rim such as 4 secured around the periphery of the glass.

What I claim is:

Spectacles comprising thin, elongated frame means having a centrally located nose piece associated therewith, a pair of lens means for association with said frame means and in detachable interchangeable relationship therewith, each of said lens means having a single groove extending immediately adjacent the top perimetral edge and only on one side thereof, a resilient wire-like element secured to the back face of said frame means in substantially parallel relationship therewith, each of said wire-like elements including a central body portion and inwardly turned end portions thereby forming an elongrated slot therebetween in which said lens means is disposed, one of said end portions being rigidly secured to the back face of said frame means adjacent the nose piece, and the other of said end portions being in the form of an arcuate loop, said loop lying in a plane substantially transverse to the long axis of said frame means, and rigidly secured to said frame means adjacent the temple piece thereof, thereby increasing the resiliency of said wire-like element and facilitating the insertion of same in the groove in the lens means in snap fastener relationship.

References Cited in the file of this patent

UNITED STATES PATENTS 2,198,852    Williams _____ Apr. 30, 1940

FOREIGN PATENTS 1,069,135    France _____ Apr. 27, 1955
1,119,957    France _____ Apr. 9, 1956